United States Patent
Martin et al.

(10) Patent No.: US 7,058,514 B2
(45) Date of Patent: Jun. 6, 2006

(54) METHOD FOR ATTENUATING NOISE IN SEISMIC DATA USING COMPLEX TRACE DIVERSITY FILTER

(75) Inventors: Federico D. Martin, Rio de Janeiro (BR); Oscar Garcia, Missouri City, TX (US)

(73) Assignee: PGS Americas, Inc., Houston, TX (US)

( * ) Notice: Subject to any disclaimer, the term of this patent is extended or adjusted under 35 U.S.C. 154(b) by 143 days.

(21) Appl. No.: 10/881,614

(22) Filed: Jun. 30, 2004

(65) Prior Publication Data

US 2006/0004520 A1 Jan. 5, 2006

(51) Int. Cl.
*G01V 1/28* (2006.01)

(52) U.S. Cl. .................................................. 702/17

(58) Field of Classification Search ............... 702/17, 702/14, 18; 367/73
See application file for complete search history.

(56) References Cited

U.S. PATENT DOCUMENTS

| | | | |
|---|---|---|---|
| 3,398,396 A | | 8/1968 | Embree |
| 5,448,531 A | * | 9/1995 | Dragoset, Jr. ............... 367/45 |
| 5,850,622 A | * | 12/1998 | Vassiliou et al. ............ 702/17 |
| 5,995,907 A | * | 11/1999 | Van Bemmel et al. ....... 702/16 |
| 6,208,587 B1 | * | 3/2001 | Martin ........................ 367/50 |
| 2004/0049347 A1 | * | 3/2004 | Fookes et al. ............... 702/14 |

OTHER PUBLICATIONS

Taner, M.T., Koehler, F., Sheriff, R.E., "The computation and interpretation of seismic attributes by complex trace analysis", Seiscom Delta, Inc., 1977, Houston, Texas.
Kanasewich, E.R., "Time Sequence Analysis in Geophysics", The University of Alberta Press, 1975, Second revised edition, Alberta, Canada, pp. i-364.

* cited by examiner

*Primary Examiner*—Donald McElheny, Jr.
(74) *Attorney, Agent, or Firm*—E. Eugene Thigpen; Richard A. Fagin

(57) ABSTRACT

A method is disclosed for attenuating noise in seismic data. The method includes calculating a trace envelope for at least part of at least one seismic trace, generating a filtered envelope from the trace envelope, and transforming the filtered envelope to a filtered trace. In one embodiment, a length of a filter operator used for generating the filtered envelope is inversely related to a maximum frequency to be preserved in the filtered trace.

8 Claims, 13 Drawing Sheets

METHOD FOR ATTENUATING NOISE IN SEISMIC DATA USING COMPLEX TRACE DIVERSITY FILTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of seismic data acquisition. More particularly, the invention relates to methods for processing seismic data to reduce the effects of noise.

2. Background Art

Seismic survey data are used to infer structure of the Earth's subsurface and to infer composition of the rock formations in the Earth's subsurface. Seismic survey data are acquired by deploying a seismic energy source at a selected position near the Earth's surface, and deploying one or more seismic receivers at selected positions near the Earth's surface in the vicinity of the seismic energy source. The source may be an explosive, an air or water gun, a vibrator, or arrays of such devices. The seismic energy source is actuated at various times, and a record is made with respect to time of signals detected by the one or more seismic receivers.

Seismic energy radiates generally downwardly from the source until it reaches one or more subsurface acoustic impedance boundaries in the subsurface. The seismic energy is reflected upwardly, back through the Earth formations, until it is detected by the one or more receivers near the Earth's surface. Seismic surveying is also conducted from the surface of bodies of water (marine seismic surveying), such as the ocean, by towing an air gun, water gun or arrays of such guns near the water surface behind a seismic survey vessel. Seismic receivers are towed by the same or a different vessel. Irrespective of whether the seismic survey data are recorded on land or on a body of water, the recordings of detected seismic energy are used to infer the structures of and the composition of the rocks in the Earth's subsurface. Typically, structures are inferred from the travel time of the reflected seismic energy from the source to the one or more receivers. Composition may be inferred from the seismic energy travel time, and characteristics of the detected seismic energy, such as its amplitude, phase and frequency content.

In order to accurately infer the subsurface structure and composition of the Earth's subsurface, seismic data recordings should be as free as is practical from the effects of noise. Noise may result from any one of a number of sources, including electronic noise in the various components of the data recording system, "burst" noise from an extraneous source including the seismic vessels in a marine survey and drilling and/or other industrial equipment in a land-based seismic survey. Many methods are known in the art for attenuating the effects of various types of noise present in seismic survey data. Some methods known in the art include attenuation of certain components of the seismic data recordings, such as components being outside of a selected frequency range, or having amplitude range or other characteristic of the seismic data falling outside a selected range or value, or above or below a selected threshold.

Methods known in the art, for example, K (trace mix), F–K (frequency-wavenumber), and Tau-p (slant stack) for processing seismic data to reduce the effect of noise are susceptible to trace-to-trace statics. What is needed is a robust method for reducing effects of noise in seismic data that has reduced susceptibility to trace-to-trace statics.

SUMMARY OF INVENTION

One aspect of the invention is a method for attenuating noise in seismic data. A method according to this aspect of the invention includes calculating a trace envelope for at least part of at least one seismic trace. A filtered envelope is generated from the trace envelope. The filtered envelope is then transformed into to a filtered trace.

Other aspects and advantages of the invention will be apparent from the following description and the appended claims.

BRIEF DESCRIPTION OF DRAWINGS

FIGS. 5A-1, 5A-2 and 5A-3 show, respectively, a synthetic seismic event, amplitude and phase spectrum processed according to methods known in the art.

FIGS. 5B-1, 5B-2 and 5B-3 show, respectively, the synthetic seismic event, amplitude and phase spectrum of FIG. 5A using noise attenuation according to the invention.

DETAILED DESCRIPTION

In one embodiment of a method according to the invention, seismic data are processed in the time domain. The description which follows is explained in terms of digitally sampled seismic data, meaning that the seismic data are stored, retrieved and processed as a set of numbers representing the amplitude of the seismic signal at selected instants in time, typically indexed with respect to the actuation time of the seismic energy source. It should be understood that the process described herein is also applicable to seismic data represented in analog form.

Figure 1:
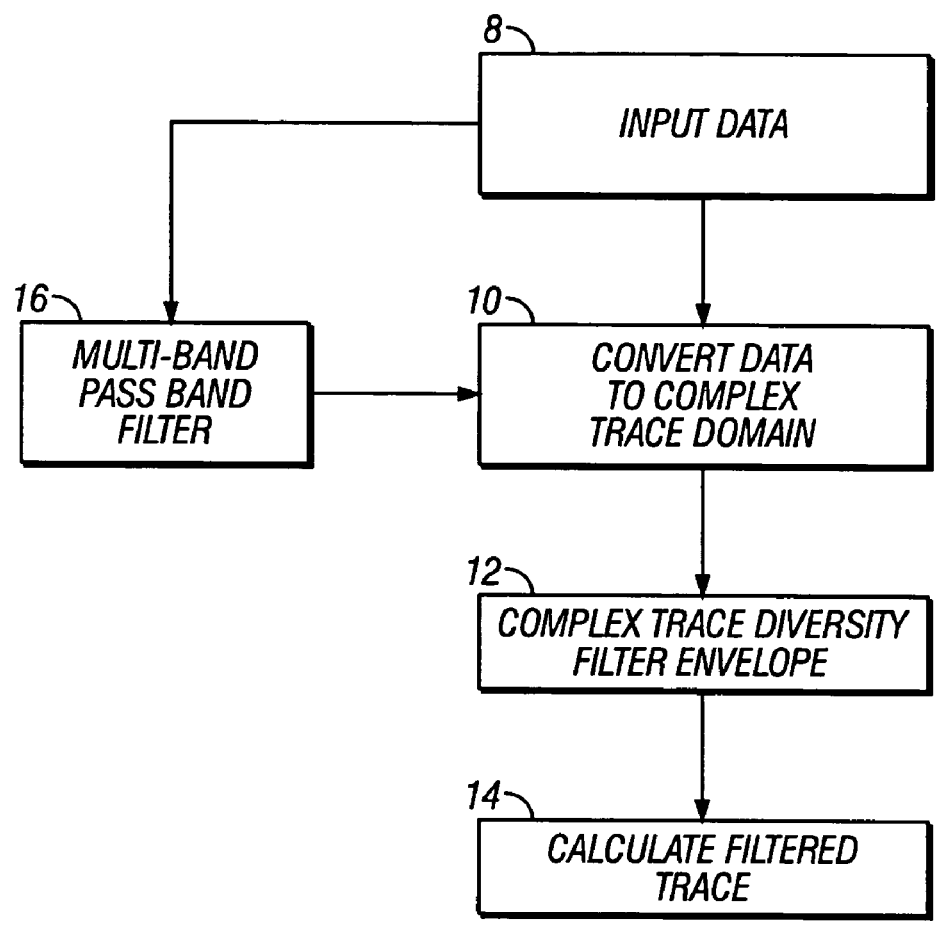
FIG. 1 shows a flow chart of one embodiment of a method according to the invention.

First, and also referring to the flow chart in FIG. 1, the seismic data, shown at 8, can be converted to the complex trace domain, shown at 10. For a seismic trace in the time domain represented by S(t), where S represents the amplitude of the seismic signal at any time t, a complex trace envelope, E(t), can be determined from the signal S(t) and its complex conjugate S*(t) by the expression:

$$E(t)=\sqrt{S(t)^2+S^*(t)^2},\quad(1)$$

in which the complex conjugate S*(t) represents the Hilbert transform of the seismic signal S(t), or alternatively represents the signal S(t) subjected to a 90 degree phase shift.

The complex trace envelope E(t) may then be filtered using a complex trace diversity filter, as shown at 12. The filter may be set to a preselected window length (a selected number of digital samples for processing digitally sampled data). The filter length is typically inversely related to the highest frequency component in the original seismic signals S(t) that are desired to be preserved in the filtering process. One embodiment of the complex trace diversity filter operator can be defined by its resulting filtered trace envelope, F(t). The filtered trace envelope F(t) can be calculated according to the following expression:

$$F(t) = \sqrt{\frac{N}{\sum_{1}^{N}\frac{1}{E(t)^2}}},\quad(2)$$

in which N represents the number of trace samples in the filter window.

After calculating the filtered complex trace envelope, a filtered data trace, $S_F(t)$ representing filtered seismic signal amplitude at selected time instants, can be calculated by determining the complex conjugate inverse of the filtered envelope according to the expression:

$$S_F(t) = \frac{F(t)}{\sqrt{1+\left(\frac{1}{\left[\frac{S(t)}{S^*(t)}\right]^2}\right)}}.\quad(3)$$

Calculating the filtered trace is shown at 14 in FIG. 1.

In another embodiment, seismic data may be transformed into the offset domain. Seismic data transformed into the offset domain represent the amplitude of the seismic signal with respect to the distance between the seismic energy source and the particular one of the seismic sensors from which the signal is used. Offset domain seismic data can be processed in a manner similar to that described above for the time domain. The transformed seismic signals are represented by S(x), which is amplitude with respect to offset. The complex conjugate of the domain-transformed seismic signal is represented by S*(x). As in the previous embodiment, first, the complex conjugate envelope of the domain-transformed seismic data can be determined by the expression:

$$E(x)=\sqrt{S(x)^2+S^*(x)^2},\quad(4)$$

Then the envelope can be filtered, such as by calculating a filtered envelope according to the expression:

$$F(x) = \sqrt{\frac{N}{\sum_{1}^{N}\frac{1}{E(x)^2}}}.\quad(5)$$

Finally, the filtered trace can be calculated as the inverse of the filtered envelope according to the expression:

$$S_F(x) = \frac{F(x)}{\sqrt{1+\left(\frac{1}{\left[\frac{S(x)}{S^*(x)}\right]^2}\right)}}.\quad(6)$$

In some embodiments, as shown at 16 in FIG. 1, and particularly for data transformed into the offset domain, the seismic signals may be pre-processed, prior to performing the complex conjugate transform (at 10) by bandpass filtering the seismic signal into a selected number of passbands. Typically the passbands will be contiguous with each other, or overlap each other, so as not to exclude any particular frequency components from the seismic data processed according to the invention. One example of bandpass filtering includes bandpass filtering the seismic data into passbands in the ranges of 5–35 Hz; 35–55 Hz; 55–75 Hz; and 75–95 Hz. In some embodiments, analysis of the passband filtered seismic data may assist in determining a length of the envelope filter operator. Analysis of the passband filtered seismic data may also improve the preserving of events in the seismic data which originate from subsurface structures, and improve noise removal from the seismic data.

Figure 2A:
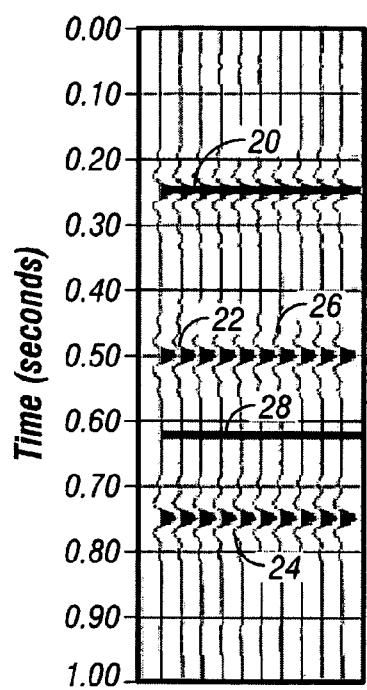
FIG. 2A shows synthetic seismic survey data based on a reflection model including three reflective events and two noise bursts.

Example results of processing seismic data using methods according to the invention will now be explained with reference to FIGS. 2A, 2B and 2C. FIG. 2A represents a synthetic seismic record section, showing synthetic seismic traces for a model of the Earth's subsurface including three reflective events, shown at 20, 22 and 24. Each trace in FIG. 2A represents a signal that would have been received by a seismic receiver position at a surface location corresponding to the coordinate position of the trace in the Figure. The events 20, 22, 24 in FIG. 2A are shown as being flat for the sake of simplicity, however, the events could also include normal moveout (NMO) wherein the event occurs at times related to the source-to receiver distance. The traces in FIG. 2A also show two distinct noise events at 26 and 28.

Figure 2B:
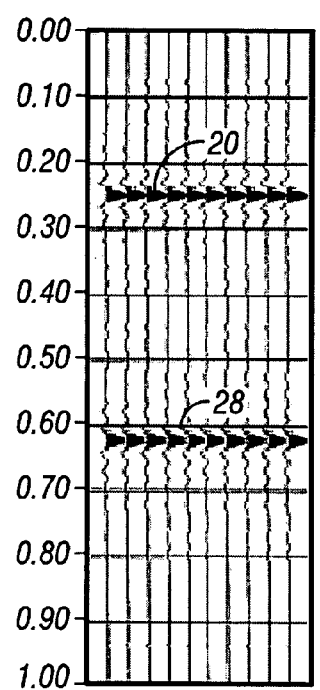
FIG. 2B shows the synthetic seismic survey of FIG. 1A after application of a noise attenuation technique known in the art.

FIG. 2B shows the synthetic seismic record section of FIG. 2A after processing using a simple bandpass filter (to filter out components having a frequency outside the filter passband). Notably, the second event 22 has been removed by the passband filter, while noise burst 22 still remains in the record section.

Figure 2C:
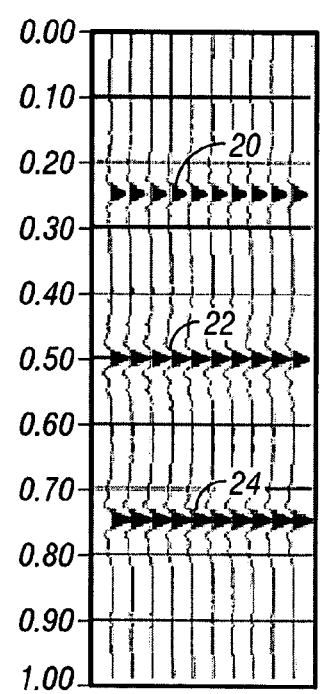
FIG. 2C shows the synthetic seismic survey of FIG. 1A after processing by one embodiment of a method according to the invention.

FIG. 2C shows the same record section as shown in FIG. 2A after application of a method according to the invention and as explained with reference to FIG. 1. Notably, the two noise bursts 26, 28 have been substantially eliminated, while all three events 20, 22, 24 remain in the processed record section.

Figure 3A:
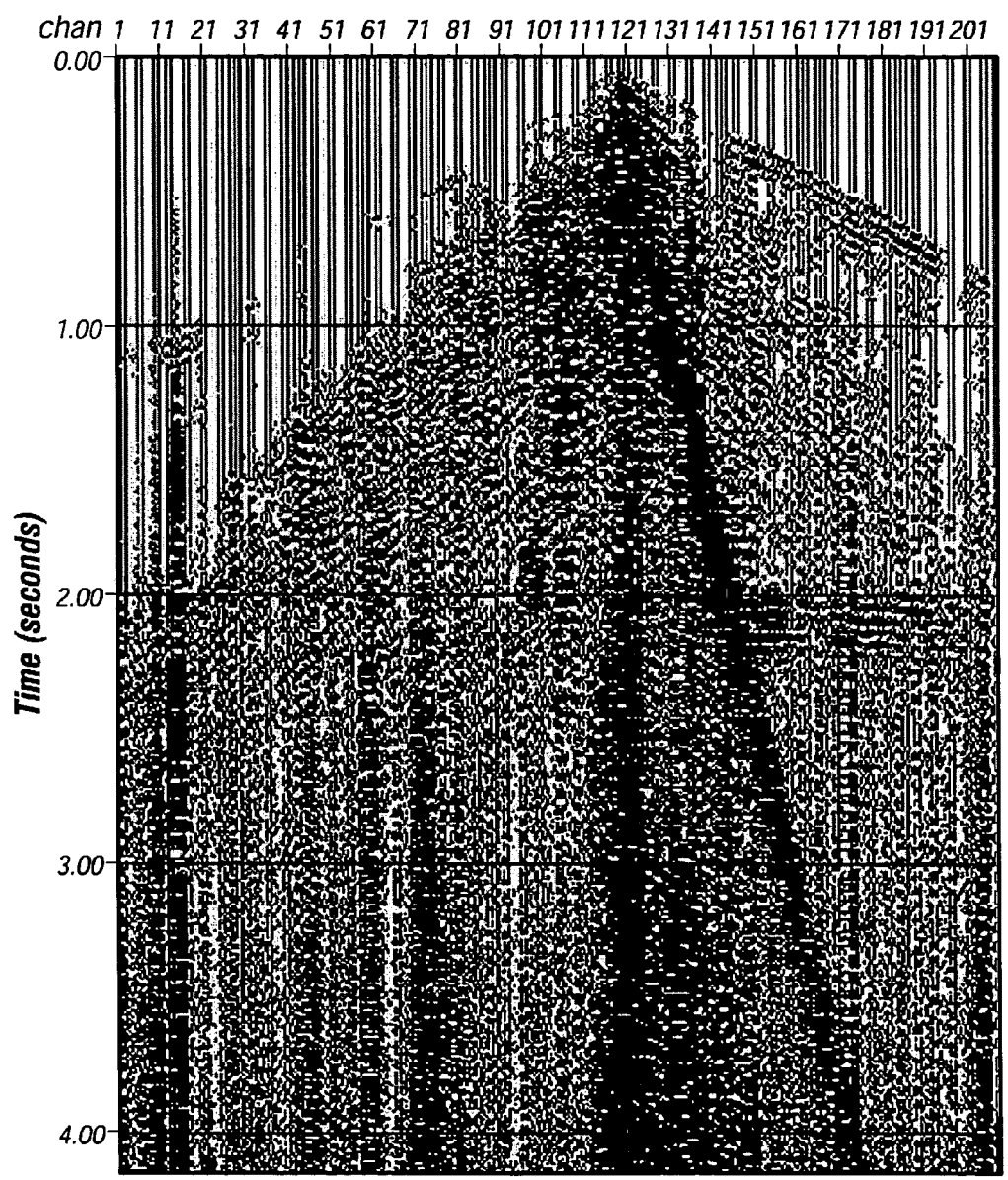
FIG. 3A shows a shot record (trace display of seismic data recorded with respect to time and position of the receivers) before processing.
Figure 3B:
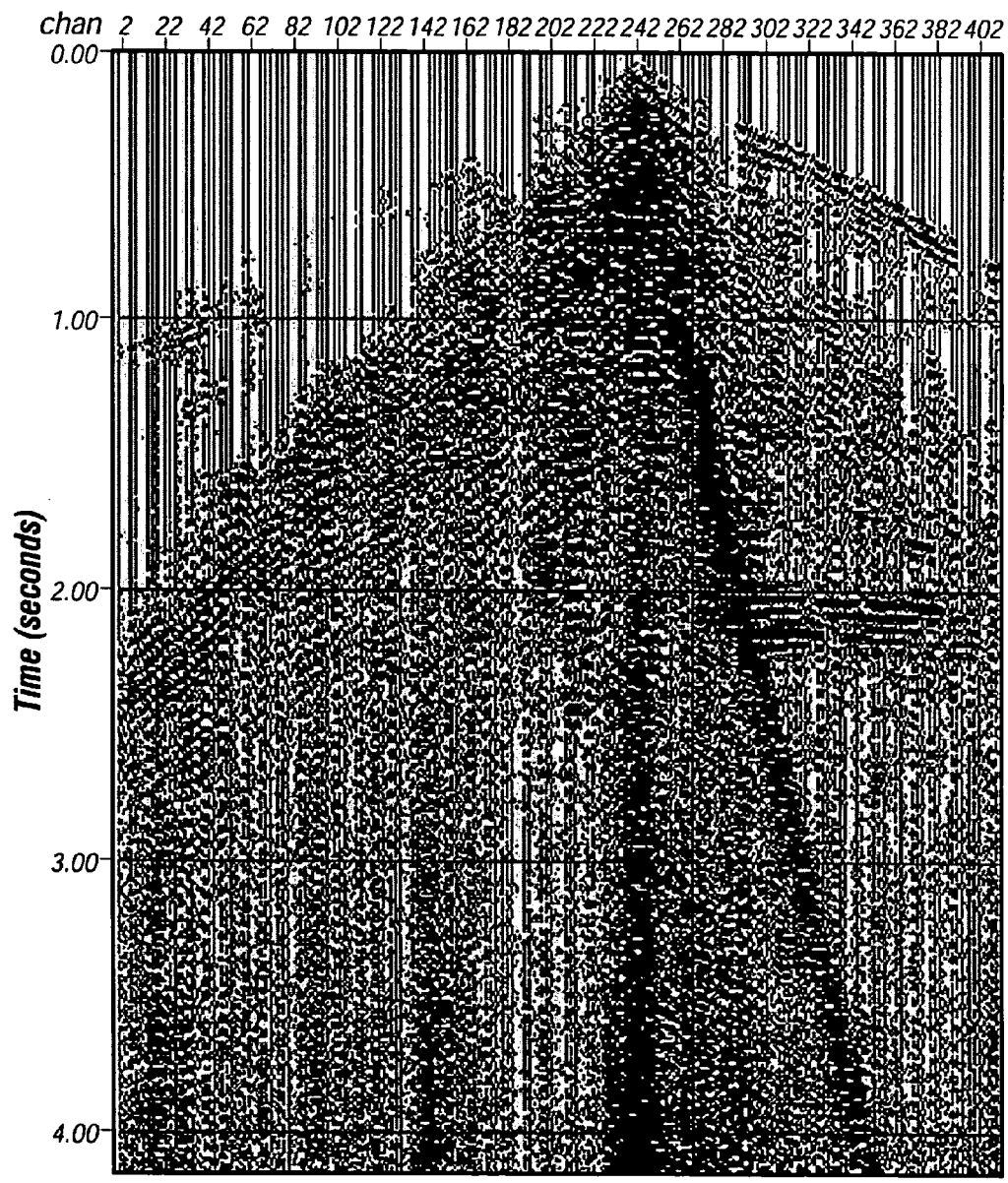
FIG. 3B shows the shot record of FIG. 3A after filtering according to one embodiment of the invention.

Another example of seismic data processed according to the invention will be explained with reference to FIGS. 3A and 3B. FIG. 3A represents a "raw" shot record, meaning a plot with respect to time of the amplitude recordings made at each one of a plurality of spaced apart seismic receivers. FIG. 3B shows the shot record of FIG. 3A after processing according to the invention.

Figure 4A:
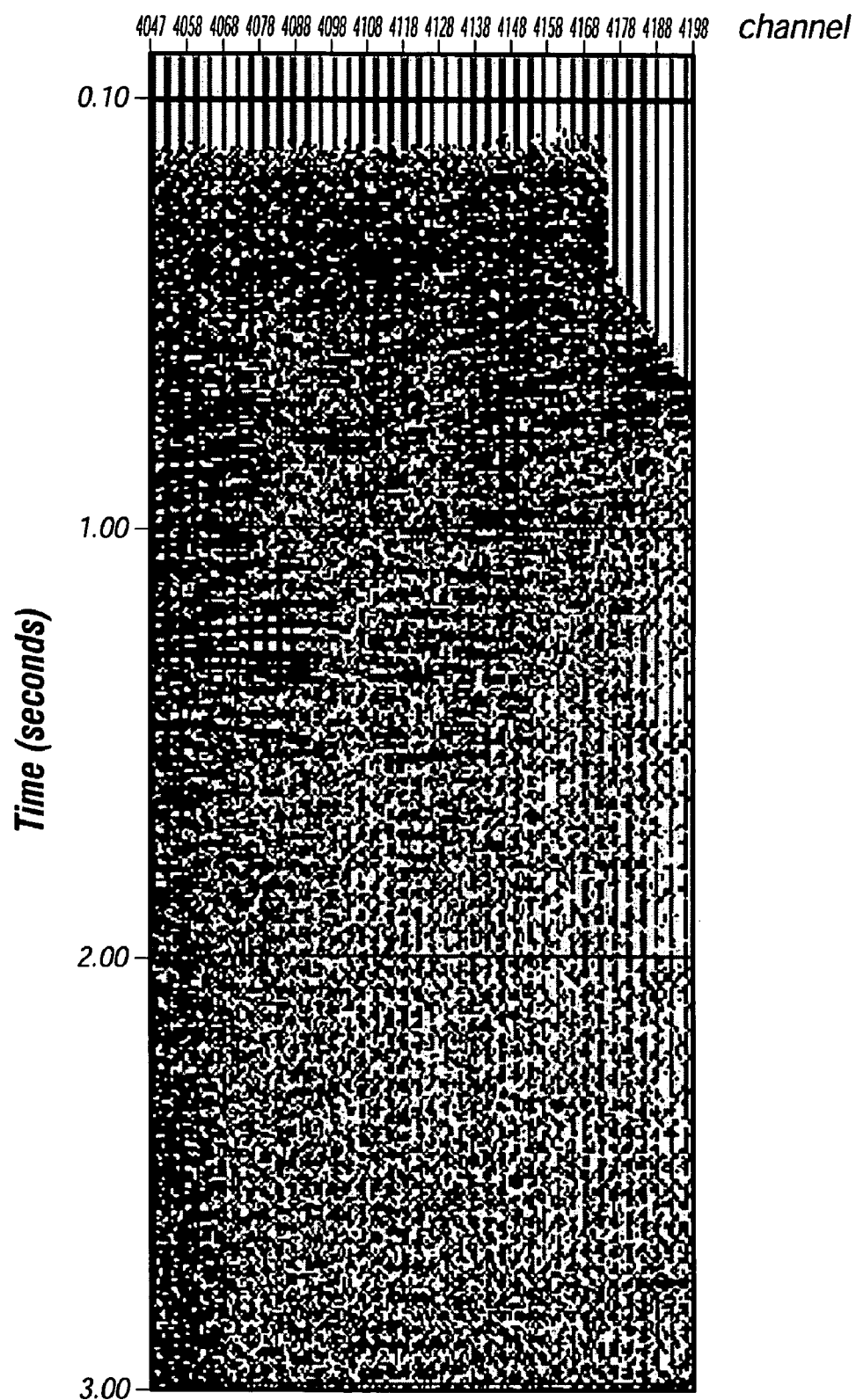
FIG. 4A shows a stacked record section before application of a method according to the invention.
Figure 4B:
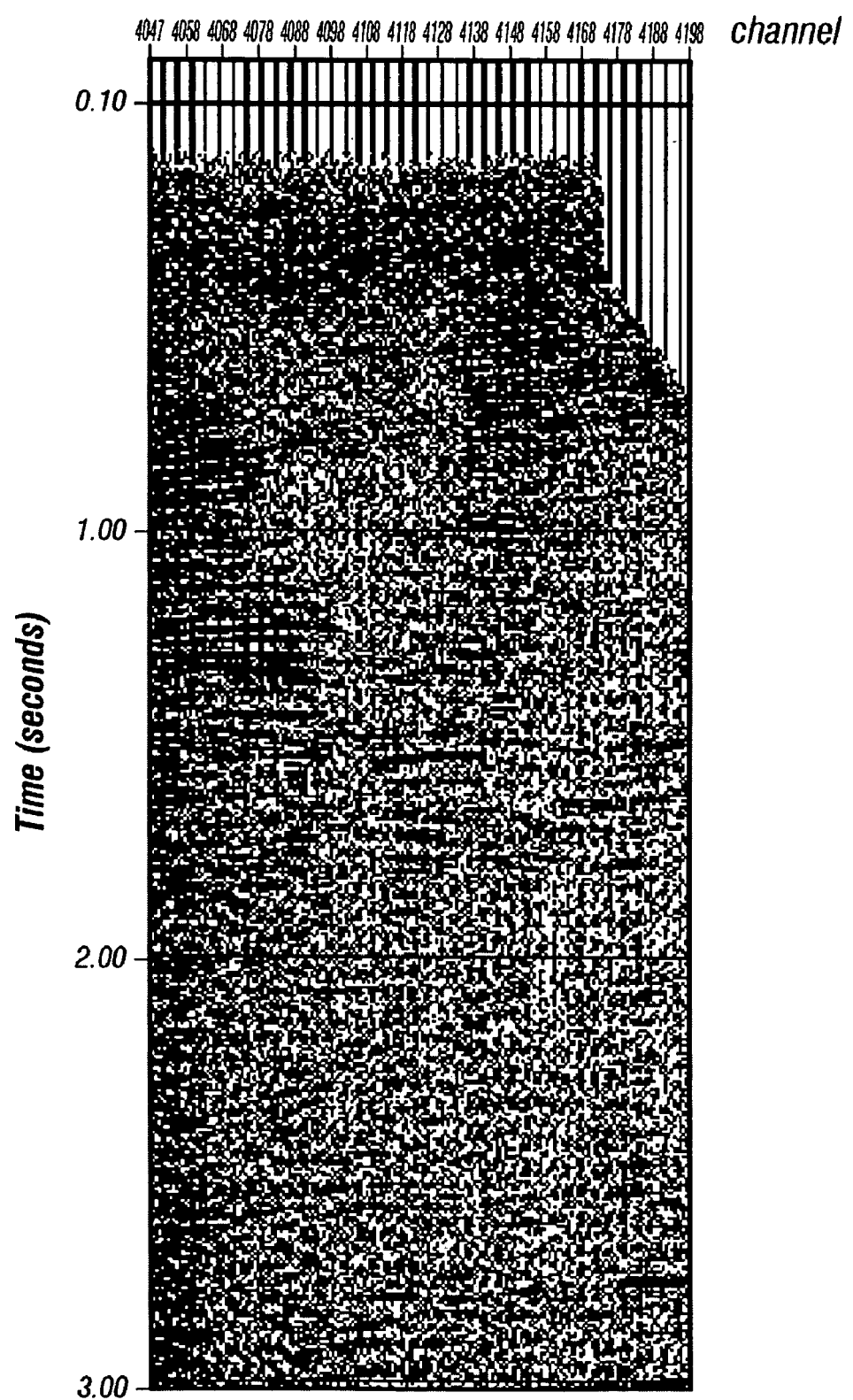
FIG. 4B shows the stacked record section of FIG. 4A after application of a filter according to one embodiment of the invention.

Similarly, FIGS. 4A and 4B show, respectively, seismic data after stacking both before and after processing according to the invention.

Figures 1, 5A:
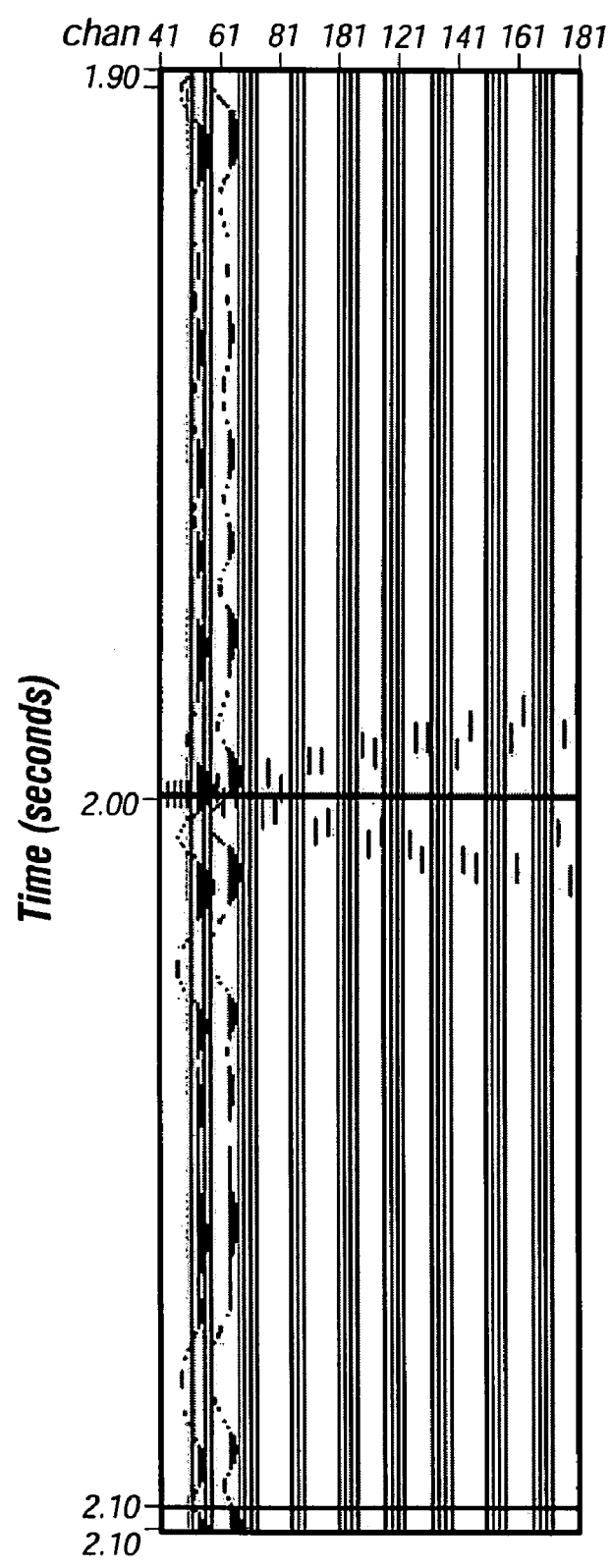
Figures 2, 5A:
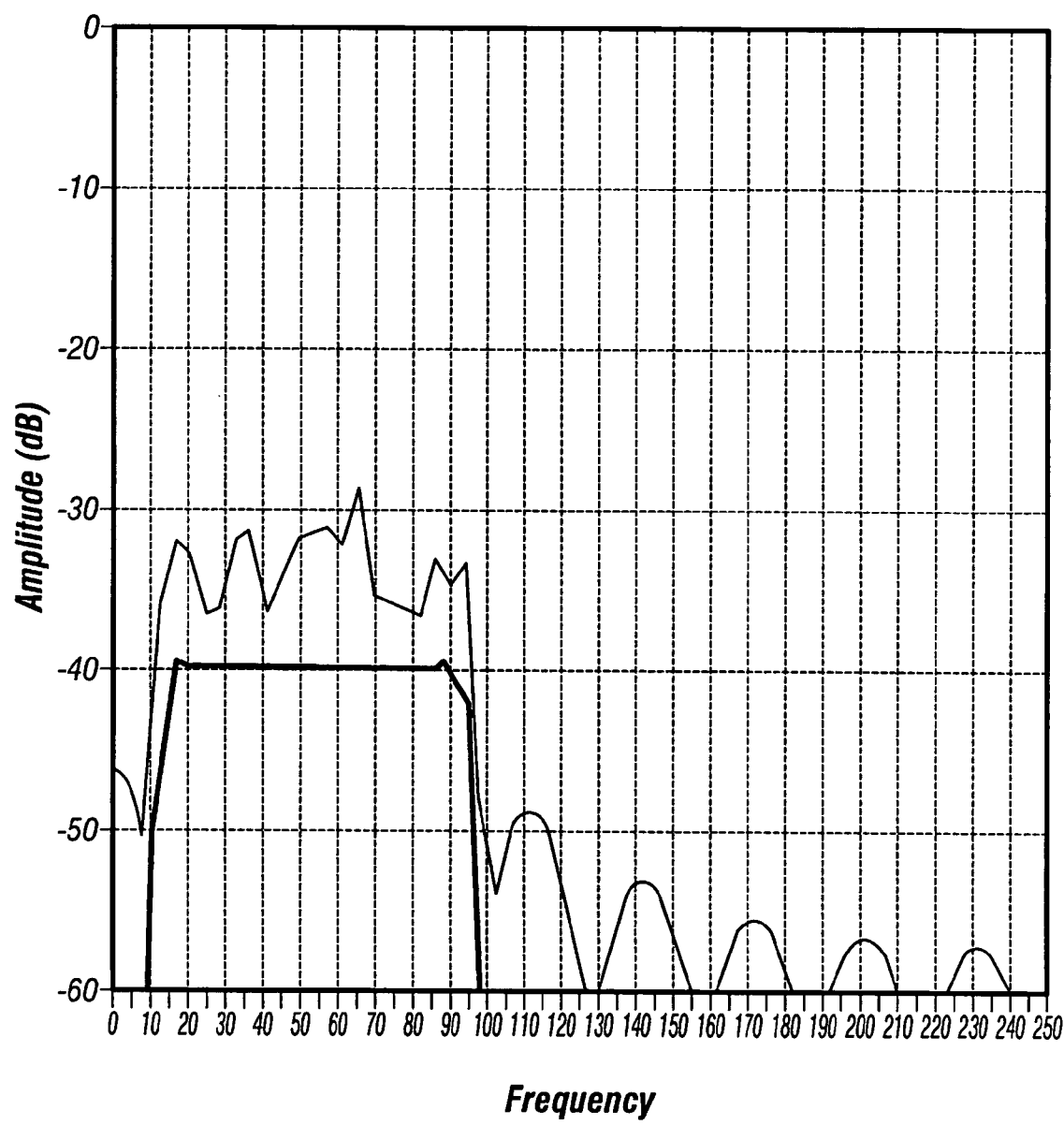
Figures 3, 5A:
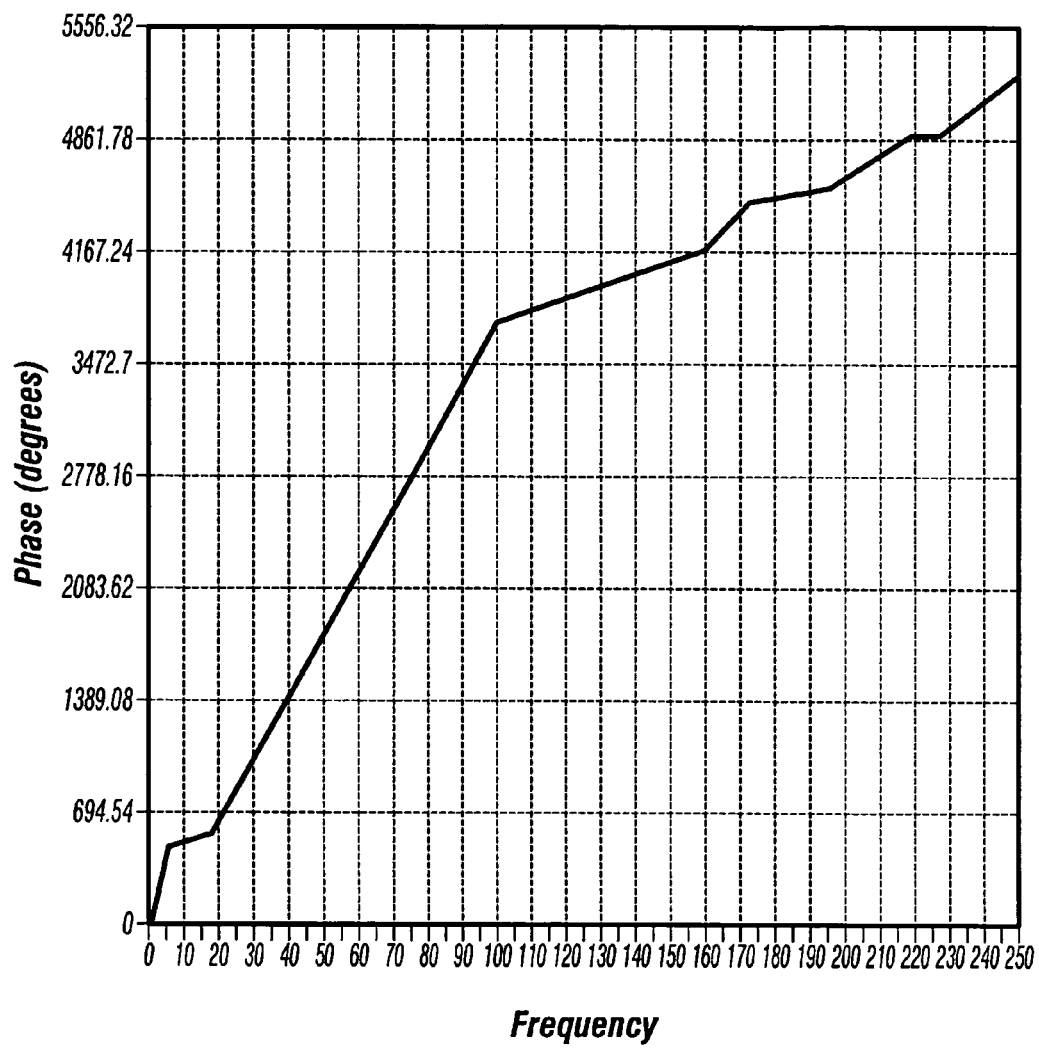

An example of how processing according to the invention is relatively insensitive to static changes between traces as compared with prior art techniques will now be explained with reference to FIGS. 5A-1, 5A-2 and 5A-3 and FIGS. 5B-1, 5B-2 and 5B-3. FIG. 5A-1 shows a synthetic seismic section including a single reflective event at 2.00 seconds two way reflection time, including two noisy receiver traces, and having been filtered according to a prior art noise attenuation method. An amplitude and phase spectrum analysis for the traces in FIGS. 5A-1 appear in FIGS. 5A-2 and 5A-3, respectively. Traces extending laterally from left to right have added thereto a synthetic static amplitude shift R(x) represented by the expression:

$$R(x) = A(x) \sin(x), \qquad (7)$$

where A(x) represents an amplitude scalar proportional to the offset x (increasing from left to right), and sin(x) is the sine of the offset value. The amplitude static is thus a sinusoidal value which increases in amplitude with increasing offset. Notably, two noisy traces appear to overshadow the results, in this case the power spectra.

Figures 1, 5B:
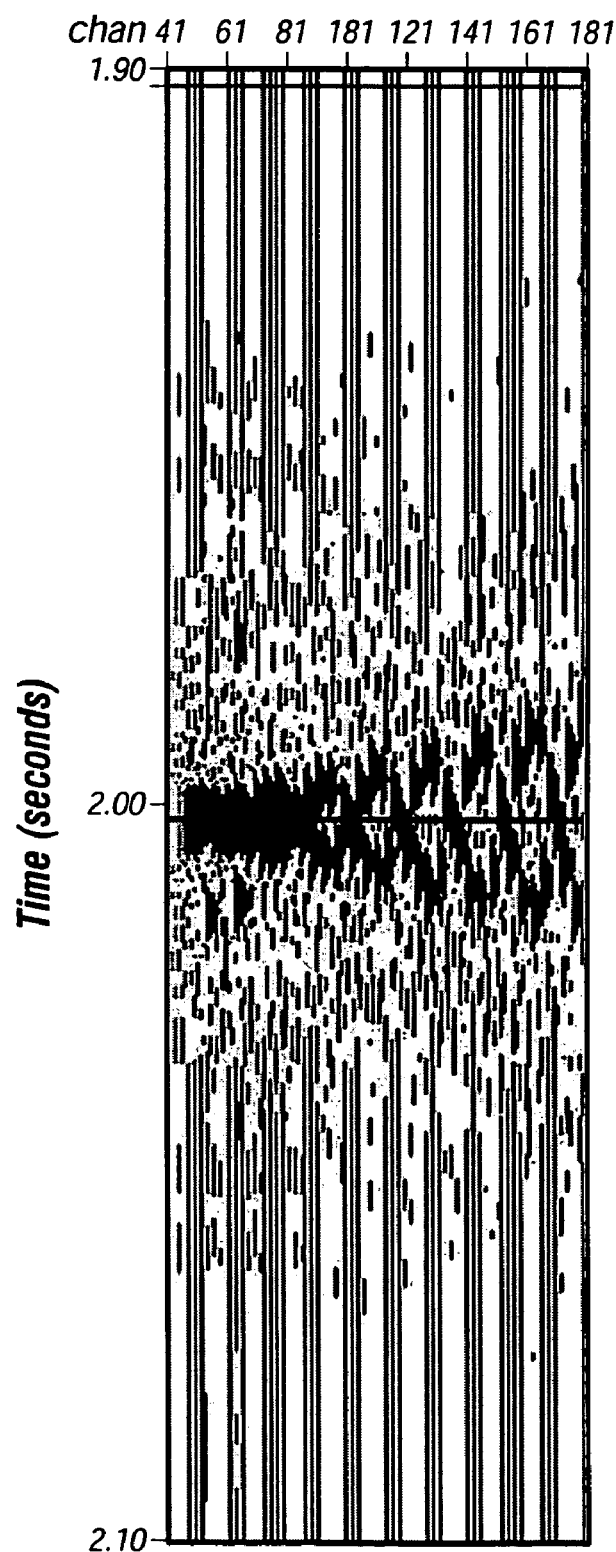
Figures 2, 5B:
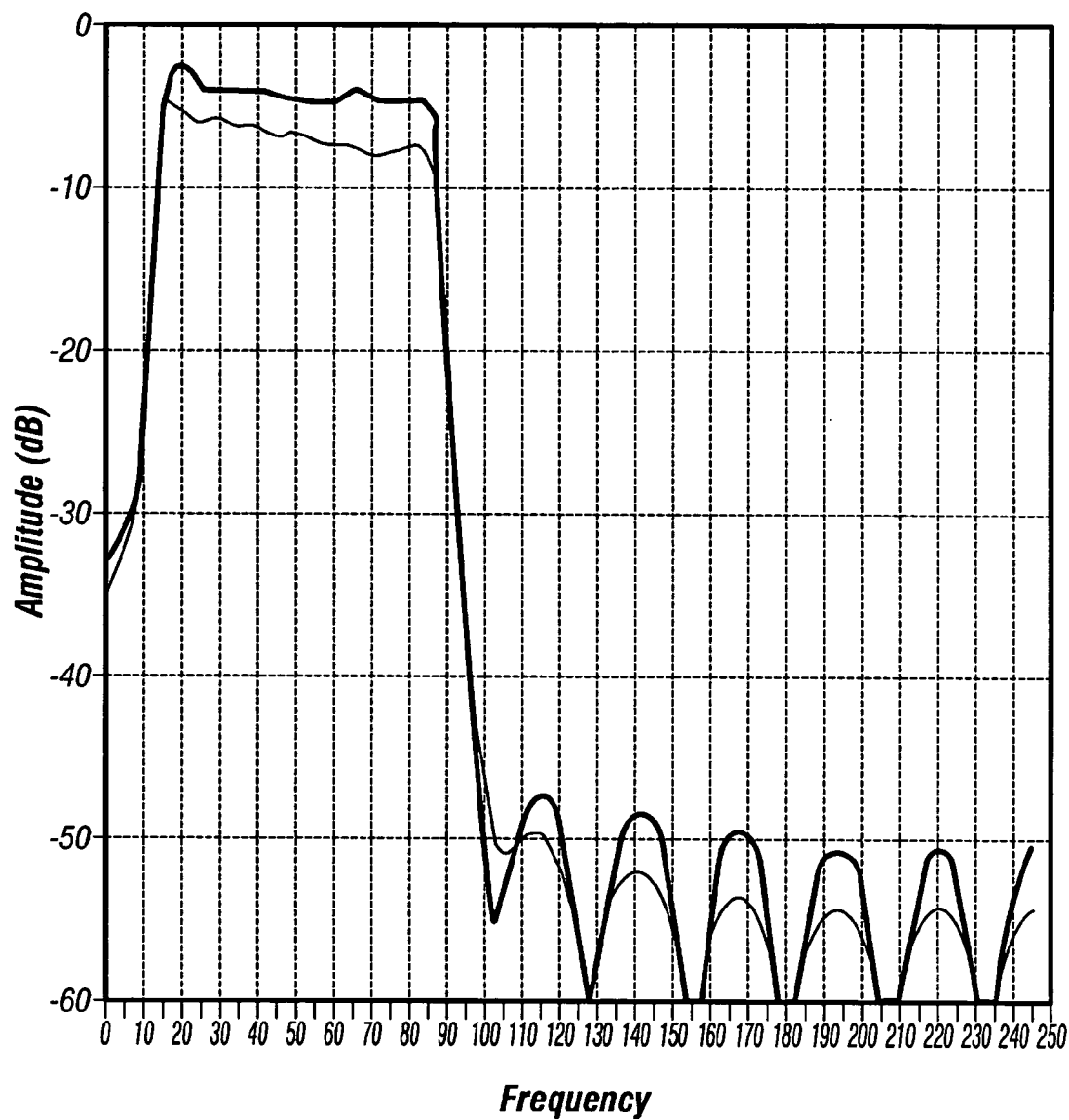
Figures 3, 5B:
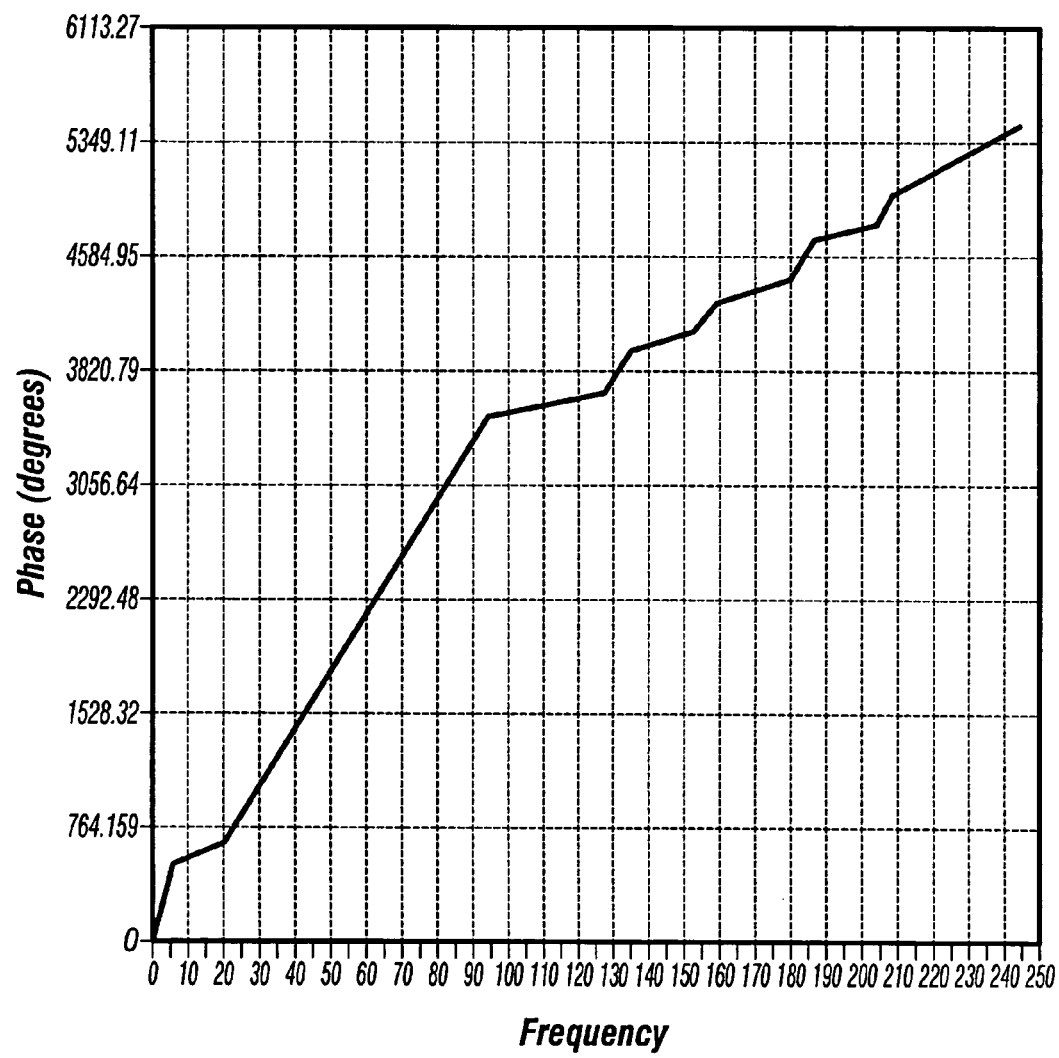

By comparison, the traces shown in FIG. 5B-1 have been filtered according to a method as explained with reference to FIG. 1. The traces in FIG. 5B-1 include the same two noisy channels and the same static amplitude shift as does the trace in FIG. 5A-1. Notably, the static amplitude shift is substantially retained, after a multi-trace processing procedure, while the two noisy traces have the noise therein substantially attenuated. Corresponding amplitude and phase spectra for the traces in FIG. 5B-1 are shown, respectively, in FIGS. 5B-2 and 5B-3.

Figure 6:
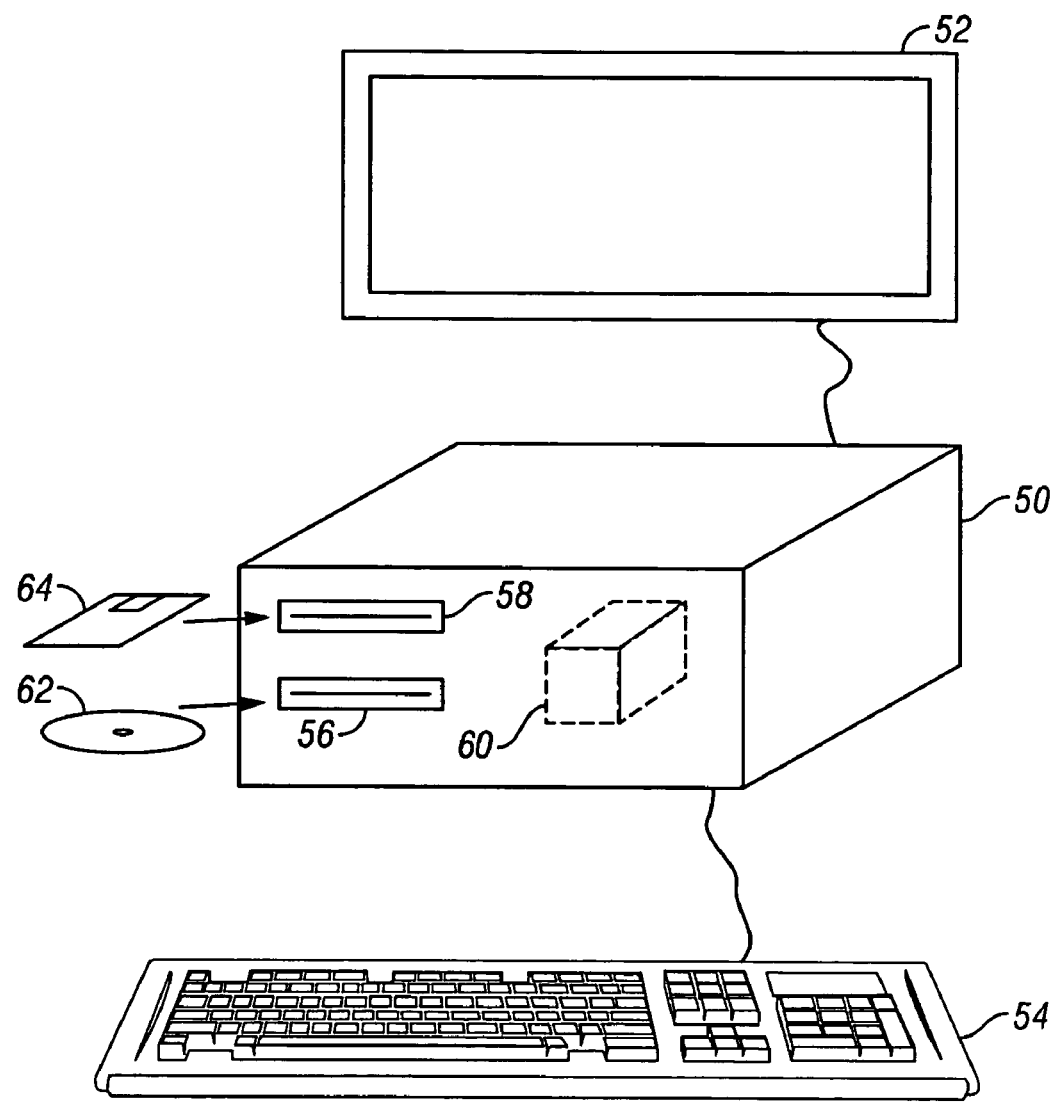
FIG. 6 shows a general purpose programmable computer configured to read a computer program according to the invention.

The foregoing embodiments of methods according to the various aspects of the invention may be performed by a suitably programmed general purpose computer. An example of such a computer is shown in FIG. 6 having a central processor 50. The processor 50 is coupled to a user input device 54 such as a keyboard, and is coupled to a display 52 such as a cathode ray tube (CRT) or flat panel liquid crystal display (LCD). A computer program according to this aspect of the invention may reside on any one of a number of types of computer readable medium, such as compact disk 62 insertable into a CD reader 56, magnetic "floppy" disk 64 insertable into a floppy disk drive 58, or the program may reside in a hard drive 60 within or remote from the processor 50. The program includes logic operable to cause a programmable computer to perform the data processing sequences described above with reference to FIG. 1. The particular embodiment in which a computer program is stored is not meant to limit the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for attenuating noise in seismic data comprising:
   calculating a complex trace envelope for at least part of at least one seismic trace;
   generating a filtered envelope from the trace envelope; and
   transforming the filtered envelope to a filtered trace.

2. The method of claim 1 wherein the at least part of at least one trace represents seismic signal amplitude with respect to time.

3. The method of claim 1 wherein the at least part of at least one trace represents seismic signal amplitude with respect to offset.

4. The method of claim 1 wherein a length of an operator used for the generating the filtered envelope is inversely related to a maximum frequency to be preserved in the filtered trace.

5. A computer program stored in a computer readable medium, the program including logic operable to cause a programmable computer to perform steps comprising:
   calculating a complex trace envelope for at least part of at least one seismic trace;
   generating a filtered envelope from the complex trace envelope; and
   transforming the filtered envelope to a filtered trace.

6. The program of claim 5 wherein the at least part of at least one trace represents seismic signal amplitude with respect to time.

7. The program of claim 5 wherein the at least part of at least one trace represents seismic signal amplitude with respect to offset.

8. The program of claim 5 wherein a length of an operator used for the generating the filtered envelope is inversely related to a maximum frequency to be preserved in the filtered trace.

* * * * *